Jan. 6, 1959 R. WHITAKER 2,867,537
PROCESS FOR PRODUCING CREAMED COTTAGE CHEESE
Filed Sept. 26, 1955
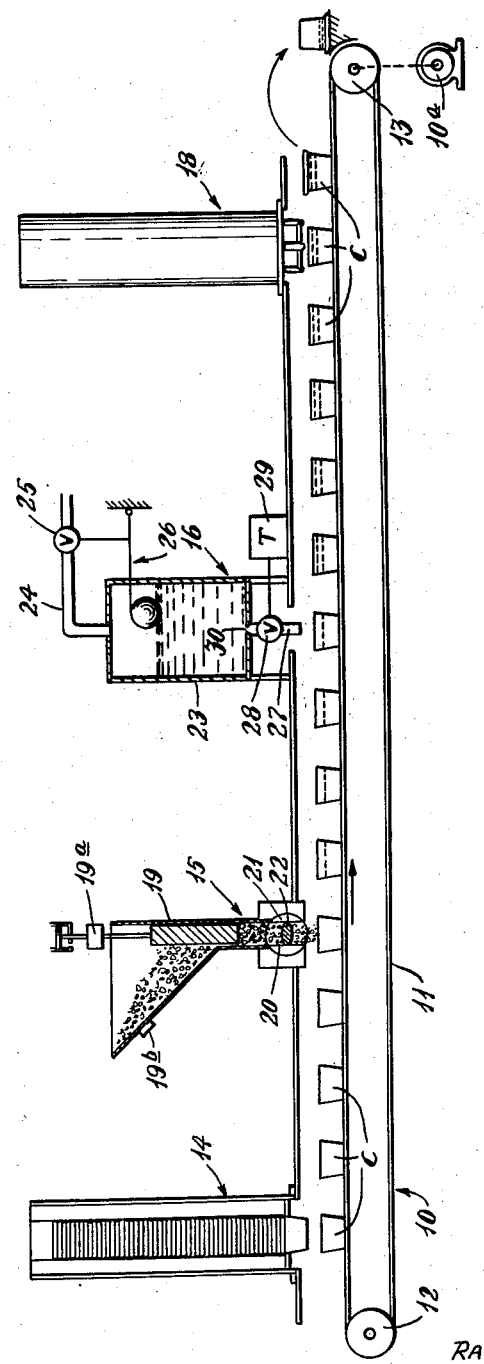
INVENTOR.
RANDALL WHITAKER
BY
ATTORNEYS United States Patent Office 2,867,537
Patented Jan. 6, 1959

2,867,537

PROCESS FOR PRODUCING CREAMED COTTAGE CHEESE

Randall Whitaker, Sayville, N. Y., assignor, by mesne assignments, to National Dairy Products Corporation, New York, N. Y., a corporation of Delaware Application September 26, 1955, Serial No. 536,399

5 Claims. (Cl. 99—178)

This invention relates to processes for preparing creamed cottage cheese in which the contrasting flavors of the cottage cheese curd and the cream retain their individual identities throughout a reasonably long shelf life.

These is a marked difference in both taste and texture between freshly creamed cottage cheese, say a few hours old, and that which has been creamed for a period of more than a day or two. In the fresh product the pleasing taste sensations of the mildly acid curd and the rich creaminess of the cream are perceptible, and the curd particles are discrete, having a tender texture and a smooth shiny appearance. In the older product, the cream and curd tend to become blended together, the fluidity of the cream agent is reduced, the contrasting flavors of the cream and curd disappear and a pasty, sticky substantially uniform mass results. Moreover, it is difficult using conventional manufacturing and packaging techniques to produce individual containers of a creamed cottage cheese product which meets precisely the statutory standards for butterfat and solids content.

One conventional process for preparing creamed cottage cheese involves the blending of relatively large masses of dry or uncreamed curd and proportional amounts of cream in a batch process usually by means of agitation of the mixture to insure proper distribution of the cream throughout the curd mass. So blended, the product is filled into containers by suitable filling equipment. As stated, there is a tendency after a short period of time for the product to change in its properties both as to consistency and taste. It is generally believed that these changes are due to absorption of the cream by the curd.

Another process involves reducing the mixing to a minimum by placing part of the necessary amount of cream in large milk cans in which the cheese is to be stored, adding the curd to the cream and pouring the balance of the cream over the curd. The cans of cream and curd are then held for many hours and the creamed curd is then emptied into the package fillers without further agitation or mixing. The resultant mass does not become uniform throughout as to the ratio of cream to curd and one consumer portion taken from the mass of cream and curd might have too little cream and another too much.

In connection with the present invention, it has been found that the rate of disappearance or loss of identity of the cream is most rapid over the first 18 to 24 hours, continuing at a relatively slower rate thereafter. It has been discovered that the rate of taking on of cream by cottage cheese curds is a direct function of the agitation given the cream and curd mixture to produce a uniform product. The more the agitation, the greater and faster the taking on of the cream by the curd. In the light of these data, tests were performed involving timed exposures of dry curd masses to cream and in some cases to emulsified mixtures of butter oil and skim milk. In the case of the tests with cream the aqueous phase of the cream was colored with a water-soluble dye and in the case of the tests using the butter oil and skim milk the butter oil was colored with a fat-soluble dye. These tests established that the changes observed in the physical appearance of creamed cottage cheese are not due to absorption of the cream by the curd, as is widely believed, but to adsorption on and near the surface of the curd.

It has been concluded, therefore, that the basis of the rapid change in physical characteristics of creamed cottage cheese formed by conventional agitating processes, whether by the use of hand forks or power beaters, is due to the resulting increase in the ratio of surface area of the curd to curd volume, i. e., the inevitable creation of fines and sub-divided curds which rather quickly take on cream virtually throughout their small masses to destroy the taste identities so essential to the prdouct. A feature of the present invention, therefore, involves the preparation of creamed cottage cheese without breaking down the curd size, which is to say without subjecting the curd and cream to mechanical blending actions, a technique heretofore useless on a commercial scale because without thorough agitation there was no known practical way of meeting the set statutory standards for butterfat and solids content in each individual container sold.

In accordance with the present invention, creamed cottage cheese is prepared and packaged by separating small, measured quantities of uncreamed or dry cottage cheese curd from a curd mass prepared by standard diary procedures and preferably handled thereafter so that the curd particles are maintained large and discrete. The measured quantities are deposited without materially affecting the curd particle size, into the individual containers in which the finished, creamed product is to be marketed. This filling operation may be carried out, for example, by subjecting the curd mass to a pressure which never exceeds a predetermined magnitude. A representative apparatus for performing this operation is described briefly below and is fully disclosed in the copending application Serial No. 536,400, filed September 26, 1955.

Brought together with each measured quantity of dry curd in the container by means of a separate filling step is a preestablished quantity of cream, which can be measured out either manually, or mechanically as described below. The curd and cream are preferably initially placed in separate strata, the cream being either above or below the curd and the two commingling intimately. The curd and cream are then kept as separate as their natural affinity for one another permits by avoiding, for example, agitation within the container. The containers are capped or sealed with an appreciable quantity of cream remaining in a free state. The statutory standards as to percent butterfat and solids are, of course, fully and accurately met because it is known precisely how much of each component goes into each container. If desired, the individual containers of curd and cream can be disposed in a position for shipping in which gravity tends to maintain a substantial portion of the cream on the bottom, the container being inverted only at the time of sale to the consumer.

Referring to the drawing, there is shown a representative mechanism for carrying out steps of the method of the present invention automatically. A conveyor 10 which can take the form, for example, of an endless belt 11 operating around pulleys 12 and 13 is utilized to carry containers C, as placed by a suitable container supply apparatus 14, in sequence past dry cheese curd metering apparatus 15, cream metering apparatus 16, and a container capping and sealing apparatus 18. The conveyor 10 is preferably driven intermittently by driving means 10a and in synchronism with the operation apparatus 14—18 to present the containers while stationary for receiving a charge of dry curd, a charge of cream over the curd and a sealing cover.

The cheese curd metering apparatus, which is fully described in the copending application, Serial No. 536,400, includes a weighted piston 19 working a suitable curd hopper to urge the curd under a predetermined maximum pressure which is independent of the length of the stroke of the piston, into a throughbore 20 in a cylindrical rotor 21. As the piston 19 falls under its measured weight at a variable rate which is a function of physical properties of the curd mass, such as the existence of void spaces, cheese curd is gently urged into the bore 20 to push a freely movable piston 22 to the remote or lower end of the bore, where its motion is arrested by suitable stops. The rotor 21 is then driven in rotary movement about its axis (perpendicular to the plane of the paper as viewed in the drawing) through 180° to present its filled open end to the empty container below. The weighted piston 19 is again able to urge cheese curd into the continer. The piston can be raised automatically by suitable power means 19a after each charge is expelled and at the same time means such as a vibrator 19 can be operated to cause the cheese curd in the hopper above and about the rising piston 19 to fall into the void below to become part of the subsequent charge.

It has been found that large dry curd particles can be metered in precise quantities by this technique without materially affecting the size of the individual curd particles.

The cream dispensing apparatus 16 is arranged to dispense a predetermined amount of cream into each container over the top of the metered cheese curd. To this end the dispenser 16 comprises a reservoir 23 fed through an inlet conduit 24 having a control valve 25 operated through a constant level, float actuated linkage 26 to insure a constant level of cream in the reservoir at all times. A discharge spout 27 having a control valve 28 operated by a timer 29 dispenses the cream in predetermined quantities into successive containers. Accurate measurement of the quantity of cream is assured by the use of a closely dimensioned orifice plate 30 in the discharge nozzle 27 in conjunction with the constant static head pressure maintained by the constant liquid level, and the timing device 29.

The containers of curd and cream are then capped by the apparatus 18 without agitation of any kind occurring within the containers and inverted as illustrated in the drawing. In this fashion the cream and curd are kept as separated as possible and the curd sizes are not diminished.

It will be understood that the process may be carried out in various ways within the scope of the present invention. Thus, for example, the separate quantities of cheese curd and cream can be deposited in the containers with the cream on top of the curd. The advantages of the invention may be attained for a maximum time, however, by pouring the cream over the curd, sealing the containers and then shipping and storing the containers in inverted positions, with the consumer uprighting the container at the time of purchase or home storage.

By the practice of the present invention, a creamed cottage cheese can be prepared in which the physical appearance and contrasting taste sensations normally found only in a freshly creamed product can be maintained in individual containers for more than adequate time to reach the consumer, the highly desired properties enduring in most cases for as long as the product can be kept without undergoing the usual flavor deterioration due, for example, to the growth of bacteria, yeast, molds, or the like, or to enzymatic changes. Thus, a creamed cottage cheese product prepared in accordance with the present invention may be stored at suitable storage temperatures in the range of 35 to 38° F. without a change occurring in the physical characteristics of the product. Moreover, by the practice of the invention the placement of the correct amounts, by statutory standard, of curd and cream in each container can be readily attained, while the time required to consumate the complete operation in the dairy is reduced over that required by conventional manufacturing techniques.

It will be understood, therefore, that the process of the present invention can be practiced in any one of several ways and should not be regarded as limited except as defined by the following claims.

I claim:

1. In a process for preparing and packaging creamed cottage cheese, the steps consisting of dividing a series of predetermined measured quantities of dry cheese curd of given particle size from a mass source, dividing a series of predetermined measured quantities of cream from a mass source, depositing separately in each of a series of consumer containers measured quantities of curd and cream while preserving the initial curd particle size sealing the individual containers and inverting them for distribution to consumers.

2. In a process for preparing and packaging creamed cottage cheese, the steps consisting of preparing a dry cheese curd mass having large discrete curd particles, dividing a series of predetermined measured quantities of dry cheese curd from the mass and depositing the measured quantities respectively into a series of consumer containers while preserving substantially the initial curd particle size, dividing a series of predetermined measured quantities of cream from a mass source and depositing the quantities respectively into the containers separately from the curd while preserving substantially the curd particle size, the curd and cream combining within the containers with minimum curd surface exposed to fluid cream, sealing the containers and inverting them for distribution to consumers.

3. In a process for preparing and packaging creamed cottage cheese, the steps of dividing a series of predetermined measured quantities of dry cheese curd from a mass source by applying a pressure not exceeding a predetermined maximum into a portion of the curd mass and in the direction of a measuring space to establish a substantially uniform curd density in the space, said pressure being applied through a variable distance into the curd mass governed by the resistance imposed by the curd thereby to maintain substantially the initial curd particle size, dividing a series of predetermined measured quantities of cream from a mass source, depositing into each of a series of containers a measured quantity of curd from said space and a measured quantity of cream, sealing the individual containers and inverting them for distribution to consumers.

4. In a process for preparing and packaging creamed cottage cheese, the steps of depositing a quantity of dry cheese curd into a container while substantially preserving the initial curd particle size, depositing a quantity of cream into the container, sealing the container, and inverting the container.

5. In a process for preparing and packaging creamed cottage cheese, the steps of first depositing a measured quantity of dry cheese curd into a container while substantially preserving the initial curd particle size, then depositing a measured quantity of cream into the container, sealing the container, and inverting the container.

References Cited in the file of this patent

UNITED STATES PATENTS

| | | |
|---|---|---|
| 361,930 | Collins | Apr. 26, 1887 |
| 1,364,653 | Taliaferro | Jan. 4, 1921 |
| 1,561,939 | Lowe | Nov. 17, 1925 |
| 1,743,304 | Angell | Jan. 14, 1930 |

FOREIGN PATENTS

| | | |
|---|---|---|
| 585,302 | France | Dec. 8, 1924 |